(12) United States Patent
Kubota

(10) Patent No.: US 10,009,547 B2
(45) Date of Patent: Jun. 26, 2018

(54) IMAGE PICKUP APPARATUS THAT COMPENSATES FOR FLASH BAND, CONTROL METHOD THEREFOR, AND STORAGE MEDIUM

(71) Applicant: CANON KABUSHIKI KAISHA, Tokyo (JP)

(72) Inventor: Kouji Kubota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/613,406

(22) Filed: Jun. 5, 2017

(65) Prior Publication Data
US 2017/0366719 A1 Dec. 21, 2017

(30) Foreign Application Priority Data
Jun. 17, 2016 (JP) .................. 2016-120812

(51) Int. Cl.
| H04N 5/335 | (2011.01) |
| H04N 5/222 | (2006.01) |
| H04N 5/235 | (2006.01) |
| H04N 5/353 | (2011.01) |
| H04N 5/357 | (2011.01) |
| G06T 1/00  | (2006.01) |

(52) U.S. Cl.
CPC ........... *H04N 5/235* (2013.01); *H04N 5/3532* (2013.01); *H04N 5/3572* (2013.01); *G06T 1/0007* (2013.01)

(58) Field of Classification Search
CPC .. H04N 5/35572; H04N 5/3532; H04N 5/235; H04N 5/2624; H04N 5/2625; H04N 1/6086; H04N 5/2256; H04N 5/2357; H04N 1/0317; H04N 1/02885; H04N 1/02895
See application file for complete search history.

(56) References Cited

U.S. PATENT DOCUMENTS

| 9,558,395 B2 | 1/2017 | Fukuyama | |
| 2012/0188403 A1* | 7/2012 | Gomita | H04N 5/2351 348/226.1 |
| 2013/0208149 A1* | 8/2013 | Kamiya | H04N 5/217 348/241 |
| 2015/0229818 A1 | 8/2015 | Fukuyama | |

FOREIGN PATENT DOCUMENTS

JP   2015-149691 A   8/2015

* cited by examiner

*Primary Examiner* — Sinh Tran
*Assistant Examiner* — Selam Gebriel
(74) *Attorney, Agent, or Firm* — Fitzpatrick, Cella, Harper & Scinto

(57) ABSTRACT

An image pickup apparatus which is capable of properly detecting and compensating for flash bands to generate a corrected image with no different levels of luminance. Based on an image signal output from an image pickup device which sequentially starts exposure and reads out signals for each row of pixels, a flash band appearing in a plurality of frames consecutive in terms of time due to an external flash is detected. Gains are changed with rows of the frames. At least one of the frames in which the flash band was detected is corrected to a full-screen flash image. When flash bands caused by a plurality of external flashes fired in one frame is detected, a gain is calculated based on a light quantity ratio between the external flashes, and a region where the flash bands overlay each other is multiplied by the gain to generate the full-screen flash image.

11 Claims, 7 Drawing Sheets

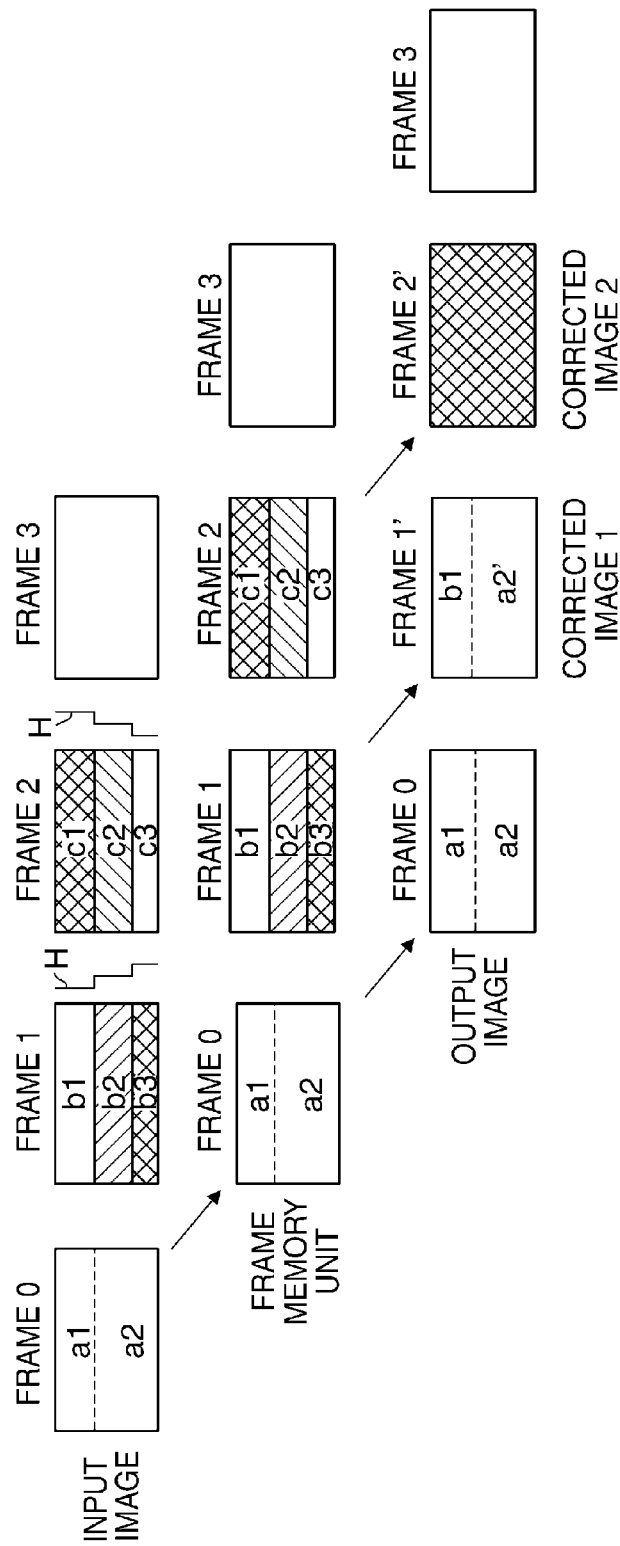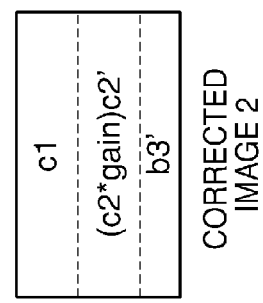

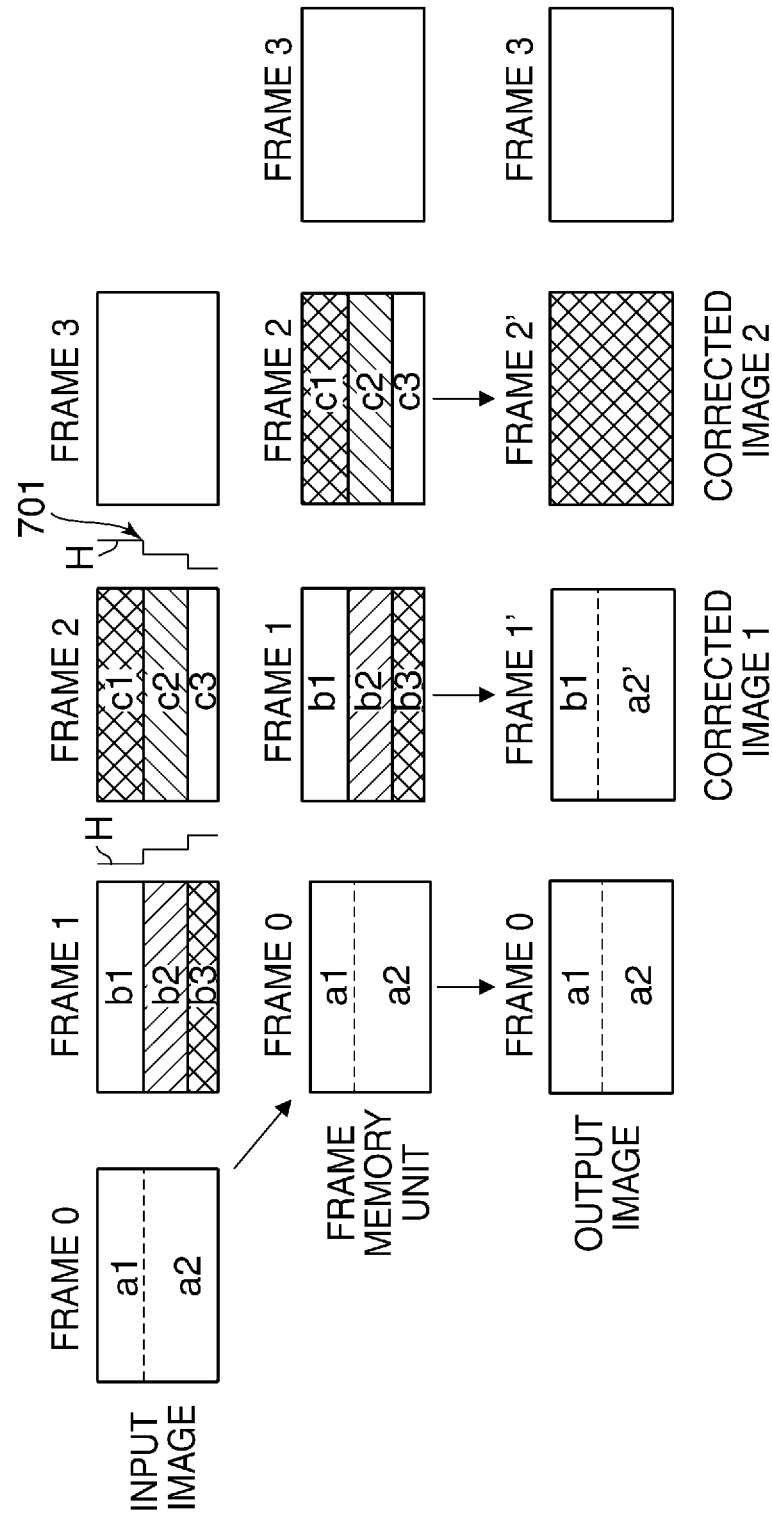

IMAGE PICKUP APPARATUS THAT COMPENSATES FOR FLASH BAND, CONTROL METHOD THEREFOR, AND STORAGE MEDIUM

BACKGROUND OF THE INVENTION

Field of the Invention

The present invention relates to an image pickup apparatus such as a digital single-reflex camera, a digital still camera, or a digital video camera, a control method therefor, and a storage medium, and in particular, to improvements in flash band compensation technique of the image pickup apparatus.

Description of the Related Art

Some image pickup apparatuses such as a digital camera have a rolling shutter image pickup device which sequentially starts exposure and sequentially reads out video signals for each horizontal row of pixels. Such image pickup apparatuses have a problem that since exposure periods vary with rows, a band-shaped flash band (a difference in level of luminance) appears in an image in one frame when a subject is irradiated with an external flash over a shorter period of time than a frame rate of the image pickup device.

Conventionally, there has been proposed a flash band compensation technique that generates an image with no difference in level of luminance by substituting another frame for a frame in which a flash band resulting from a single flash was detected or by averaging a frame and the immediately preceding or succeeding frame (Japanese Laid-Open Patent Publication (Kokai) No. 2015-149691).

Japanese Laid-Open Patent Publication (Kokai) No. 2015-149691 above, however, is based on the assumption that up to one flash is fired in one frame, and has a problem that if two or more flashes are fired in one frame, two or more flash bands would appear, and a compensation circuit would not function properly.

SUMMARY OF THE INVENTION

The present invention provides an image pickup apparatus which is capable of, even when flash bands appear due to a plurality of external flashes in one frame, properly detecting and compensating for the flash bands to generate a corrected image with no different levels of luminance, a control method therefor, and a storage medium.

Accordingly, the present invention provides an image pickup apparatus comprising an image pickup device configured to sequentially start exposure and sequentially read out signals for each row of pixels, a detection unit configured to, based on an image signal output from the image pickup device, detect a flash band appearing in a plurality of frames consecutive in terms of time due to an external flash, and a correction unit configured to have a gain correcting function of changing gains with rows of the frames and correct at least one of the plurality of frames in which the flash band was detected by the detection unit to a full-screen flash image, wherein when the detection unit detects flash bands caused by a plurality of external flashes fired in one frame, the correction unit calculates a gain based on a light quantity ratio between the plurality of external flashes, and when generating the full-screen flash image, multiplies a region where the flash bands overlay each other by the calculated gain to correct the region.

According to the present invention, even when flash bands appear due to a plurality of external flashes in one frame, the flash bands are properly detected and compensated for to generate a corrected image with no different levels of luminance.

Further features of the present invention will become apparent from the following description of exemplary embodiments (with reference to the attached drawings).

BRIEF DESCRIPTION OF THE DRAWINGS

FIGS. 4A and 4B are diagrams useful in explaining flash band compensation in a case where two external flashes are fired in one frame.

FIG. 7 is a diagram schematically showing frames 1 and 2 in which flash bands appear and frames 0 and 3 preceding and succeeding the frames 1 and 2, respectively.

DESCRIPTION OF THE EMBODIMENTS

Hereafter, embodiments of the present invention will be described with reference to the drawings.

Figure 1:
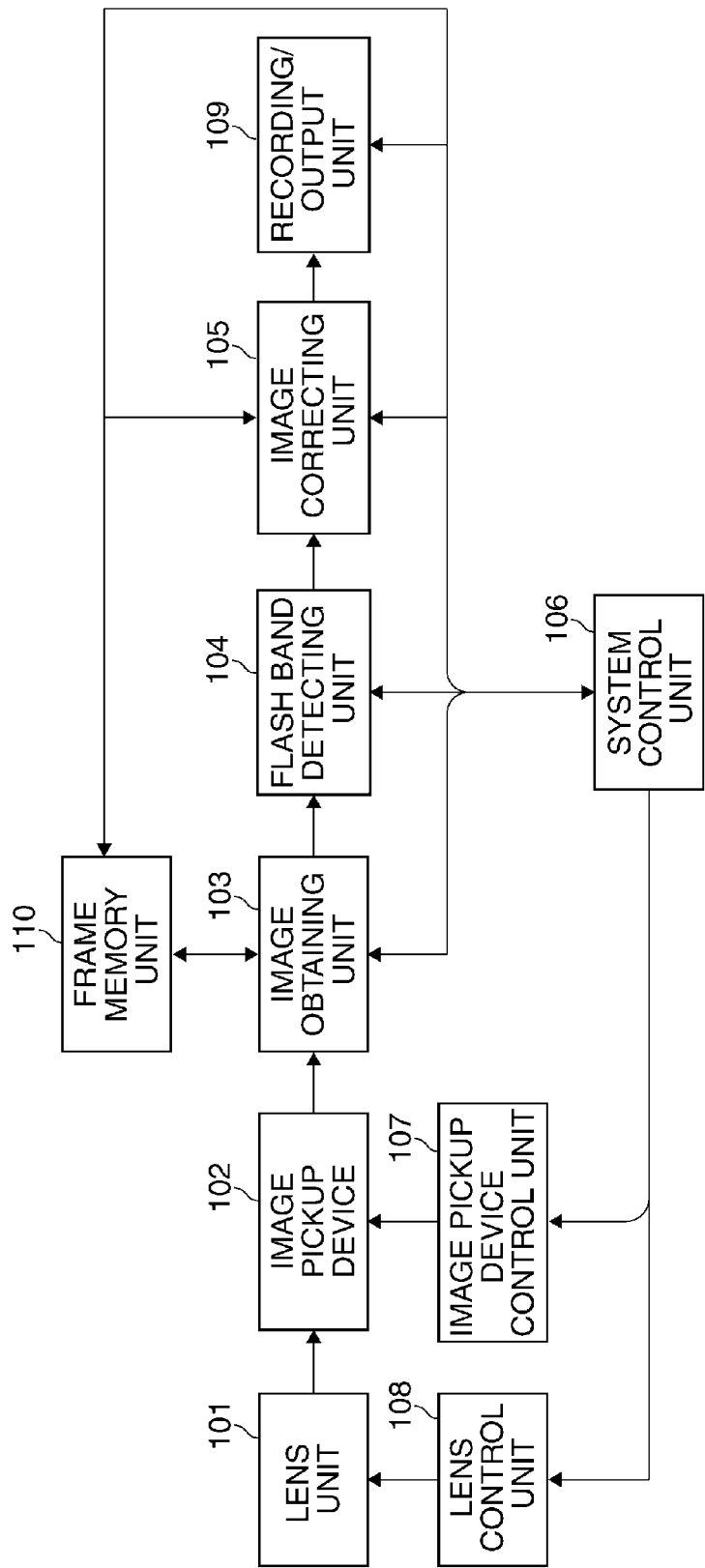
FIG. 1 is a block diagram schematically showing a control system of a digital video camera that is a first embodiment of an image pickup apparatus according to the present invention.

FIG. 1 is a block diagram schematically showing a control system of a digital video camera that is a first embodiment of an image pickup apparatus according to the present invention.

Referring to FIG. 1, a lens unit 101 has a focusing mechanism, a diaphragm mechanism, an ND filter, a zoom mechanism, and so forth. An image pickup device 102 is comprised of a rolling shutter CMOS sensor or the like, which sequentially starts exposure and sequentially reads out video signals for each horizontal row of pixels. The image pickup device 102 photoelectrically converts a bundle of rays from a subject, which forms an image through the lens unit 101, and outputs a video signal for each row. An image obtaining unit 103 obtains image information generated using the video signal output from the image pickup device 102 as a digital signal. It should be noted that the image obtaining unit 103 includes an analog-digital front-end if an output from the image pickup device 102 is an analog signal.

A flash band detecting unit 104 detects whether or not an external flash fired from a strobe or the like appears as a flash band in a video signal. When the flash band is detected by the flash band detecting unit 104, an image correcting unit 105 corrects an image in which the flash band was detected to a full-screen flash image. The image correcting unit 105 has a gain correcting function of changing gains with rows of a frame.

A system control unit 106, which includes a CPU, a RAM, a ROM, and so forth, is responsible for controlling the entire camera, and for example, sends and receives information to and from each block of the camera, determines operation of the camera through user operation, and controls operation of each block. An image pickup device control unit 107 drivingly controls the image pickup device 102. For example, the image pickup device control unit 107 provides control to calculate gain for the image pickup device 102 and output vertical drive pulses VD to the image pickup device 102 as well as to control shutter speed. Here, the shutter speed, which means an exposure time of an electronic shutter of the image pickup device 102, is controlled by the image pickup device control unit 107 sending electric charge accumulation start timing and electric charge readout timing to the image pickup device 102.

A lens control unit 108 controls the diaphragm mechanism, the focusing mechanism, the zoom mechanism, the ND filter, and so forth of the lens unit 101. A recording/output unit 109 records a video signal, which has been subjected to predetermined image correction, in a storage medium or outputs the video signal to a display device such as a display. A frame memory unit 110 stores a plurality of frames in which flash bands were detected.

Figure 2A:
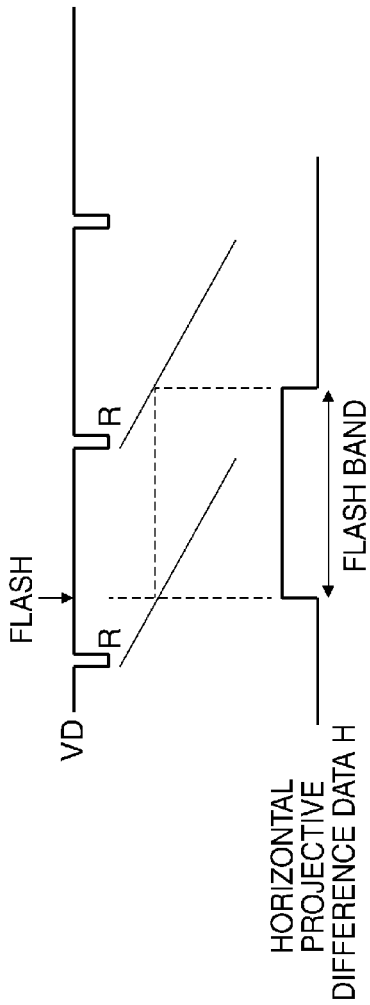
FIGS. 2A and 2B are diagrams useful in explaining flash band compensation in a case where one external flash is fired in one frame.

FIG. 2A is a timing chart showing a relationship among vertical drive pulses VD from the image pickup device 102, video signal readout timing R, and horizontal projective difference data H. When a subject is irradiated with an external flash fired from a strobe or the like as shown in FIG. 2A, a flash band appears from a row irradiated with the external flash up to the same row in a next frame. The horizontal projective difference data H is data obtained by averaging data in a horizontal direction and obtaining a difference from a preceding frame. Thus, using the horizontal projective difference data H enables detection of the flash band.

Figure 2B:
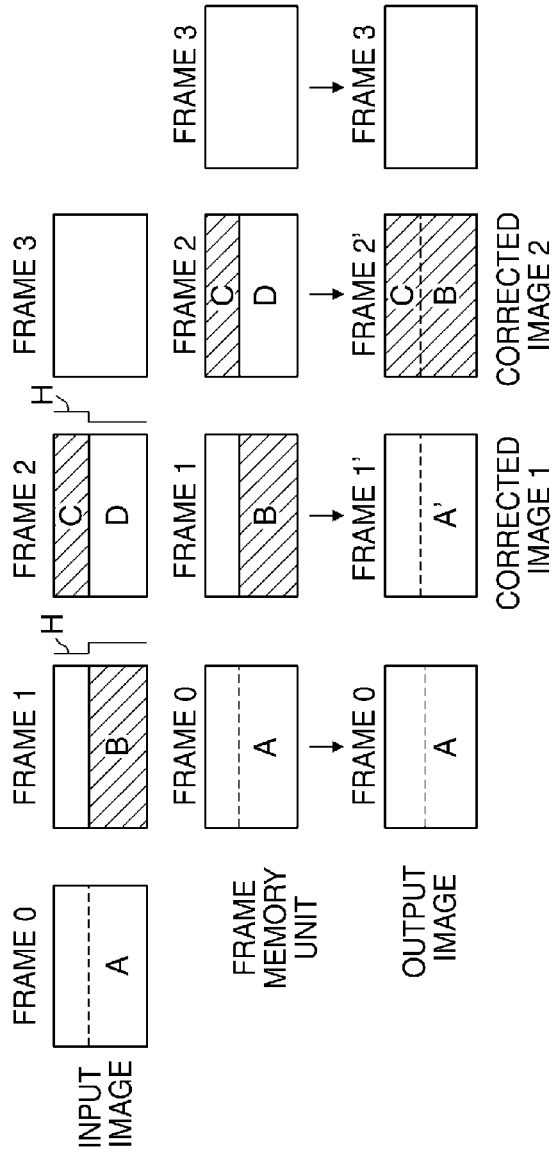

Referring to FIG. 2B, a description will be given of an ordinary method to compensate for the flash band. FIG. 2B is a diagram schematically showing frames 1 and 2 in which the flash band in FIG. 2A appears and frames 0 and 3 preceding and succeeding the frames 1 and 2, respectively. As shown in FIG. 2B, the frames 0 to 3 of input images from the image pickup device 102 are held or stored in the frame memory unit 110. The reason why the frames 0 to 3 are held in the frame memory unit 110 is that compensation cannot be started until detection of the flash band is completed.

In order to bring together the flash band extending over the frame 1 and the frame 2 into one frame as an output image, a region A' is obtained by substituting a region A in the frame 0 for a region B in the frame 1, and a region B' is obtained by substituting the region B in the frame 1 for a region D in the frame 2.

Through this substitution, a corrected image 1 is generated by turning the frame 1 into a frame 1' in which no flash band appears. Also, a corrected image 2 is generated by turning the frame 2 to a frame 2' in which a flash band appears all over the screen in this one frame.

This compensation method, however, has a problem that detection and compensation cannot be properly performed when two flashes are fired in the same frame.

Figure 3:
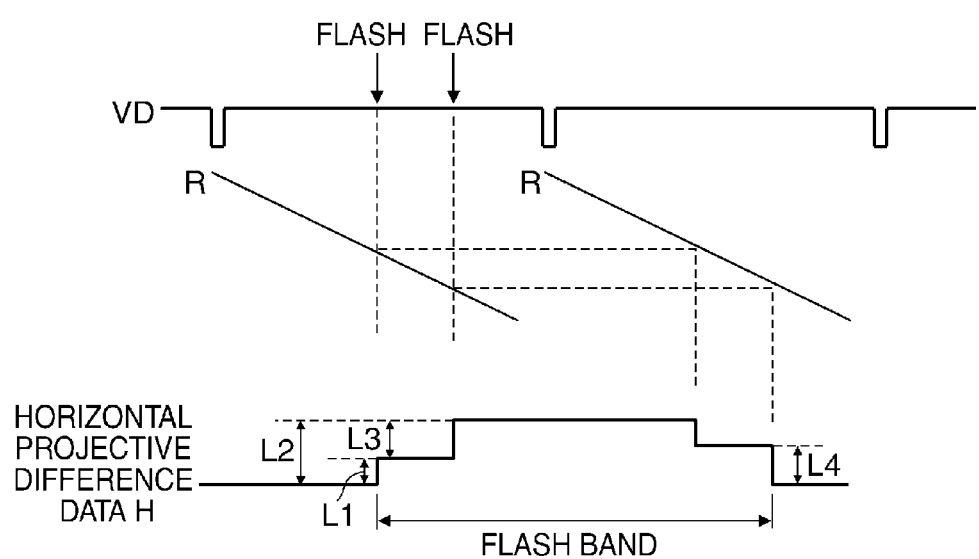
FIG. 3 is a timing chart showing a relationship among vertical drive pulses from an image pickup device, video signal readout timing, and horizontal projective difference data in a case where a plurality of external flashes are fired in one frame.

FIG. 3 is a timing chart showing a relationship among vertical drive pulses VD from the image pickup device 102, video signal readout timing R, and horizontal projective difference data H in a case where a plurality of (here, two) external flashes are fired in one frame.

In FIG. 3, an amount of change in luminance due to a light quantity of a first flash 1 is designated by L1, and an amount of change in luminance due to a total light quantity of the first flash 1 and a second flash 2 is designated by L2. Also, L3 and L4 each designate a difference in level of luminance due to the light quantity of the second flash 2.

FIG. 4A is a diagram schematically showing frames 1 and 2 in which flash bands appear due to two external flashes in the frame 1, and frames 0 and 3 preceding and succeeding the frames 1 and 2, respectively, and FIG. 4B is a diagram showing in detail a corrected image 2. As with FIG. 2B, the frames 0 to 3 of images input from the image pickup device 102 are held or stored in the frame memory unit 110 in FIG. 4A. In FIG. 4A, a region b2 in the frame 1 is a difference in level of luminance due to the first flash, a region b3 in the frame 1 and a region c1 in the frame 2 are differences in level of luminance due to the first and second flashes, and a region c2 in the frame 2 is a difference in luminance due to the second flash.

In output images, a corrected image 1 is generated by leaving the region b1 of the frame 1 as it is, and turning the frame 1 into a frame 1', which is unaffected by flashes, by substituting an region a2 of the frame 0 for the regions b2 and b3 of the frame 1 to obtain a region a2'. Also, as shown in FIG. 4B, the corrected image 2 is generated by leaving the region c1 of the frame 2 as it is, multiplying the region c2 of the frame 2 by a calculated gain L2/L1, which is a ratio of the light quantity of the flash 1 to that of the flash 2, to obtain a region c2', and substituting the region b3 of the frame 1 for the region c3 of the frame 2 to obtain a region b3'. As a result, a full-screen flash image with no different levels of luminance is generated.

Figure 5:
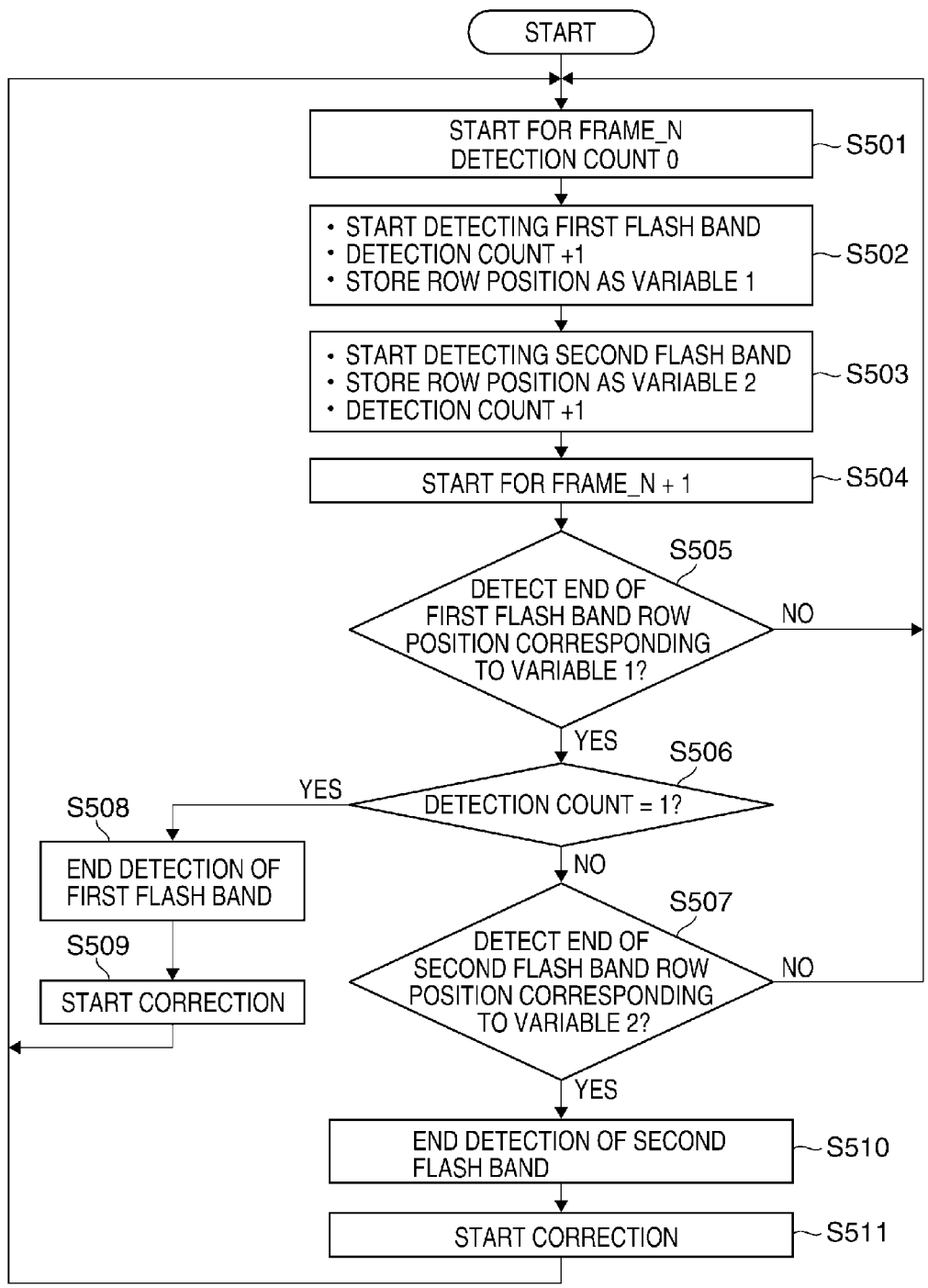
FIG. 5 is a flowchart useful in explaining a flash band compensation process in a case where two external flashes are fired in one frame.

Referring next to FIG. 5, a description will be given of flash band compensation in a case where two flashes are fired in the same frame. Processes in FIG. 5 are carried out by the CPU or the like executing programs stored in a storage unit such as the ROM or the like of the system control unit 106 and expanded into the RAM.

Referring to FIG. 5, in step S501, the system control unit 106 sets a detection count to zero and starts detection for a frame N, followed by the process proceeding to step S502.

In the step S502, when the horizontal projective difference data H exceeds a starting threshold value determined in advance, the system control unit 106 detects appearance of a flash band caused by a first external flash. The system control unit 106 then increments the detection count by one and stores a row position as a variable 1 in a memory, not shown.

In the step S503, when the horizontal projective difference data H exceeds the starting threshold value determined in advance again, the system control unit 106 detects appearance of a flash band caused by a second external flash, increments the detection count by one, and stores a row position as a variable 2 in the memory. It should be noted that the starting threshold value for the second flash band and the starting threshold value for the first flash band in the step S502 may be different values.

In the step S504, the system control unit 106 starts detection for a frame N+1, followed by the process proceeding to step S505.

In the step S505, the system control unit 106 judges whether or not a present row position corresponds to the variable 1 when the horizontal projective difference data H exceeds an ending threshold value determined in advance. The ending threshold value, which is for judging whether or not the first flash band ends, is a minus value. When the present row position does not correspond to the variable 1 (the present row position is smaller than the variable 1) the system control unit 106 judges that there is no flash band, followed by the process returning to the step S501, in which the system control unit 106 in turn continues to make the judgment. When the system control unit 106 judges that the present row position corresponds to the variable 1, the process proceeds to step S506.

In the step S506, the system control unit 106 refers to a value of the detection count, and when the value of the detection count is one, the process proceeds to step S508, and when the value of the detection count is not one, the process proceeds to step S507.

In the step S508, the system control unit 106 ends the first flash band detection, and in step S509, the system control unit 106 performs the compensation described above with reference to FIG. 2B, followed by the process returning to the step S501.

In the step S507, when the horizontal projective difference data H exceeds the ending threshold value determined in advance, the system control unit 106 detects an end of the second flash band and judges whether or not a row position corresponds to the variable 2. When the system control unit 106 judges that the row position corresponds to the variable 2, the process proceeds to step S510. When the system control unit 106 judges that the row position does to correspond to the variable 2, the process returns to the step S501 as with the step S505.

In the step S510, the system control unit 106 ends the detection of the second flash band, and in step S511, the system control unit 106 performs image correction by correcting the region c2 using the gain as described above with reference to the step S511 in FIG. 4, followed by the process returning to the step S501. It should be noted that although in the example described above, appearance of flash bands caused by two external flashes fired in one frame is detected, appearance of flash bands may be detected in the same way even when three or more external flashes are fired.

As described above, in the present embodiment, even when flash bands appear due to a plurality of external flashes fired in one frame, the flash bands are properly detected and compensated for to generate a corrected image with no different levels of luminance.

Figure 6:
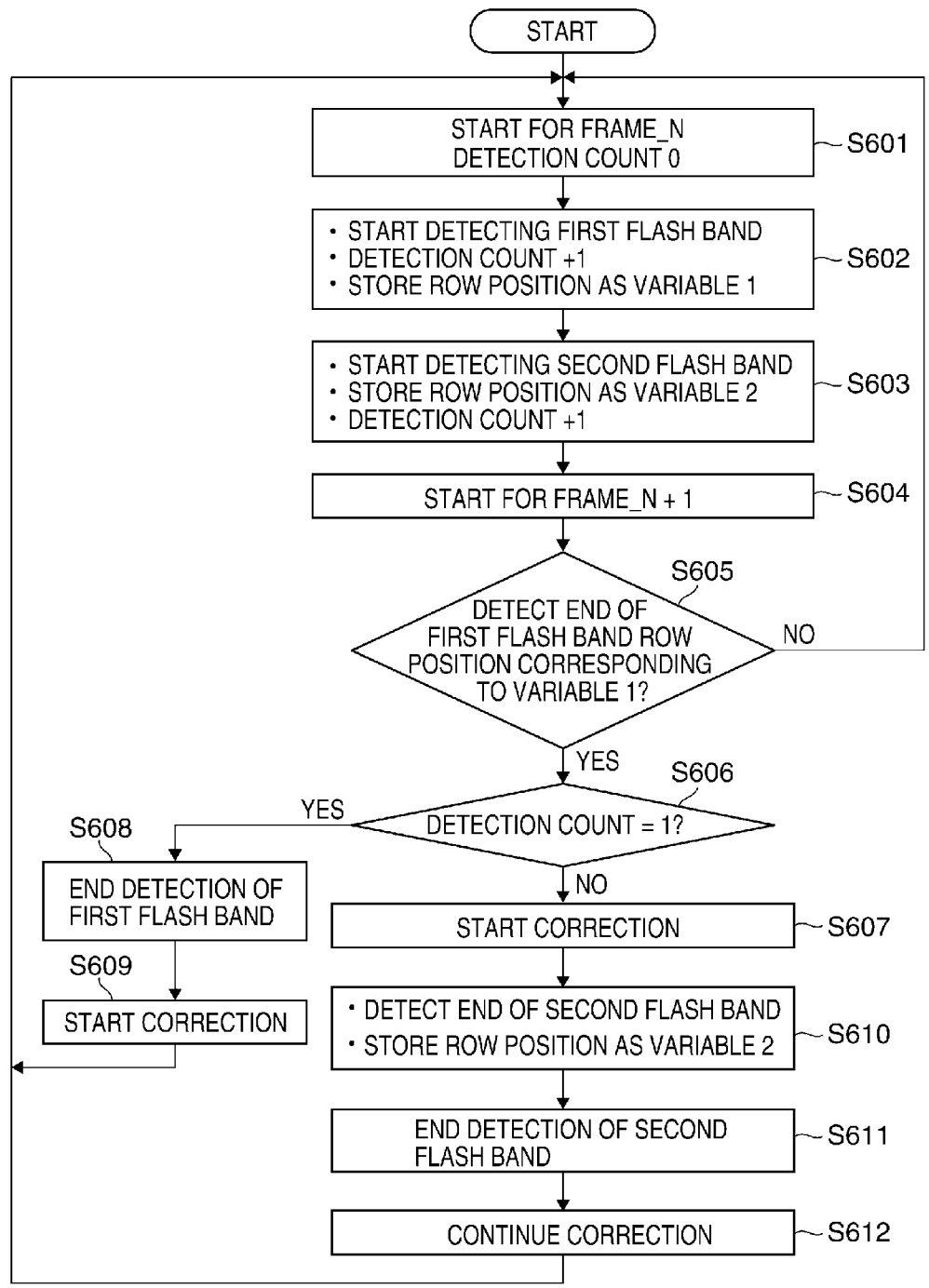
FIG. 6 is a flowchart useful in explaining a flash band compensation process in a case where two external flashes are fired in one frame in a digital video camera that is a second embodiment of the image pickup apparatus according to the present invention.

Referring next to FIGS. 6 and 7, a description will be given of a digital video camera that is a second embodiment of the image pickup apparatus according to the present invention. It should be noted that for elements corresponding to those of the first embodiment described above, the same figures and reference symbols are used in the following description of the present embodiment.

In the first embodiment described above, there is a delay of two frames because image correction is performed after whether or not to perform flash band compensation is judged after an end of the second flash band is detected. Here, it is more preferred that a frame delay in video is short, and hence in the present embodiment, a frame delay in video is shortened to one frame.

FIG. 6 is a flowchart useful in explaining a flash band compensation process in a case where two flashes are fired in the same frame. Processes in FIG. 6 are carried out by the CPU or the like executing programs stored in a storage unit such as the ROM of the system control unit 106 and expanded into the RAM. It should be noted that processes in steps S601 to S605 in FIG. 6 are the same as the steps S501 to S505, respectively, in the first embodiment described above (FIG. 5), and therefore, description thereof is omitted.

Referring to FIG. 6, in step S606, the system control unit 106 detects an end of the first flash band, and when the detection count is 1, the process proceeds to step S608. Then, as with the first embodiment (step S508) described above, the system control unit 106 ends the detection of the first flash band, and in step S609, the system control unit 106 performs the compensation described above with reference to FIG. 2B, followed by the process returning to the step S601.

On the other hand, when the detection count is not 1 in the step S606, the process proceeds to step S607, in which the system control unit 106 in turn starts correction to obtain a corrected image 1 shown in FIG. 7, followed by the process proceeding to step S610. In the step S610, the system control unit 106 detects an end of the second flash band and stores a row position as a variable 2 in the memory. In step S611, the system control unit 106 ends the detection of the second flash band, and in step S612, the system control unit 106 generates a corrected image 2 shown in FIG. 7 by correcting a region c2 using a gain as described above with reference to FIG. 4, followed by the process returning to the step S601. It should be noted that when an end of the second flash band is not detected in the step S610, a process to generate the corrected image 2 is not carried out.

FIG. 7 is a diagram schematically showing frames 1 and 2 in which the flash bands appear and frames 0 and 3 preceding and succeeding the frames 1 and 2, respectively. In the frame 2 shown in FIG. 7, timing 701 of the horizontal projective difference data H corresponds to the timing in the step S606 in FIG. 6. When the frame 1 is to be corrected, the frame 0 is read out to generate the corrected image 1 after an end of the first flash band is detected and before an end of the second flash band is detected, and therefore, there is a one-frame delay. The other constructions and operational advantages are the same as those in the first embodiment described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-120812, filed Jun. 17, 2016 which is hereby incorporated by reference herein in its entirety.

What is claimed is:

1. An image pickup apparatus comprising:
    an image pickup device configured to sequentially start exposure and sequentially read out signals for each row of pixels;
    a detection unit configured to, based on an image signal output from the image pickup device, detect a flash band appearing in a plurality of frames consecutive in terms of time due to an external flash; and
    a correction unit configured to have a gain correcting function of changing gains with rows of the frames and correct at least one of the plurality of frames in which the flash band was detected by the detection unit to a full-screen flash image,
    wherein when the detection unit detects flash bands caused by a plurality of external flashes fired in one frame, the correction unit calculates a gain based on a light quantity ratio between the plurality of external flashes, and when generating the full-screen flash image, multiplies a region where the flash bands overlay each other by the calculated gain to correct the region.

2. The image pickup apparatus according to claim 1, wherein when the detection unit detects flash bands caused by the plurality of external flashes fired in one frame, the correction unit reads out a preceding frame based on timing with which an end of the flash band caused by a first one of the external flashes to correct the frame in which the flash bands were detected.

3. The image pickup apparatus according to claim 1, wherein the detection unit averages data of the image signal, which is output from the image pickup device, in a horizontal direction, and when horizontal projective difference data that is a difference from a preceding frame exceeds a first threshold value determined in advance, detects the flash band caused by a first one of the external flashes.

4. The image pickup apparatus according to claim 3, wherein when the horizontal projective difference data exceeds a second threshold value determined in advance after the detection unit detected the flash band caused by the first one of the external flashes, the detection unit detects the flash band caused by a second one of the external flashes.

5. The image pickup apparatus according to claim 4, wherein the detection unit detects row positions at which the respective flash bands caused by the first and second external flashes fired in the one frame start.

6. The image pickup apparatus according to claim 5, wherein as to a frame succeeding the one frame, the detection unit detects a first row position at which the horizontal projective difference data is below the first threshold value and a second row position at which the horizontal projective difference data is below the second threshold value, detects an end of the first flash band according to whether the first row position and the row position at which the first flash band starts correspond to each other, and detects an end of the second flash band according to whether the row position at which the second flash band starts and the second row position correspond to each other.

7. A control method for an image pickup apparatus having an image pickup device that sequentially starts exposure and sequentially reads out signals for each row of pixels, comprising:
    a detection step of, based on an image signal output from the image pickup device, detecting a flash band appearing in a plurality of frames consecutive in terms of time due to an external flash; and
    a correction step of having a gain correcting function of changing gains with rows of the frames, and correcting at least one of the plurality of frames in which the flash band was detected to a full-screen flash image,
    wherein when flash bands caused by a plurality of external flashes fired in one frame are detected, a gain is calculated based on a light amount ratio between the plurality of external flashes, and when the full-screen flash image is to be generated, a region where the flash bands overlay each other is multiplied by the calculated gain to correct the region.

8. The control method according to claim 7, wherein when flash bands caused by the plurality of external flashes fired in one frame are detected, a preceding frame is read out based on timing with which an end of the flash band caused by a first one of the external flashes to correct the frame in which the flash bands were detected.

9. The control method according to claim 7, wherein data of the image signal, which is output from the image pickup device, is averaged in a horizontal direction, and when horizontal projective difference data that is a difference from a preceding frame exceeds a first threshold value determined in advance, the flash band caused by a first one of the external flashes is detected.

10. The control method according to claim 9, wherein when the horizontal projective difference data exceeds a second threshold value determined in advance after the flash band caused by the first one of the external flashes was detected, the flash band caused by a second one of the external flashes is detected.

11. A non-transitory computer-readable storage medium storing a program for causing a computer to execute a control method for an image pickup apparatus having an image pickup device configured to sequentially start exposure and sequentially read out signals for each row of pixels, the control method comprising:
    a detection step of, based on an image signal output from the image pickup device, detecting a flash band appearing in a plurality of frames consecutive in terms of time due to an external flash; and
    a correction step of having a gain correcting function of changing gains with rows of the frames, and correcting at least one of the plurality of frames in which the flash band was detected to a full-screen flash image,
    wherein when flash bands caused by a plurality of external flashes fired in one frame are detected, a gain is calculated based on a light amount ratio between the plurality of external flashes, and when the full-screen flash image is to be generated, a region where the flash bands overlay each other is multiplied by the calculated gain to correct the region.

* * * * *